UNITED STATES PATENT OFFICE.

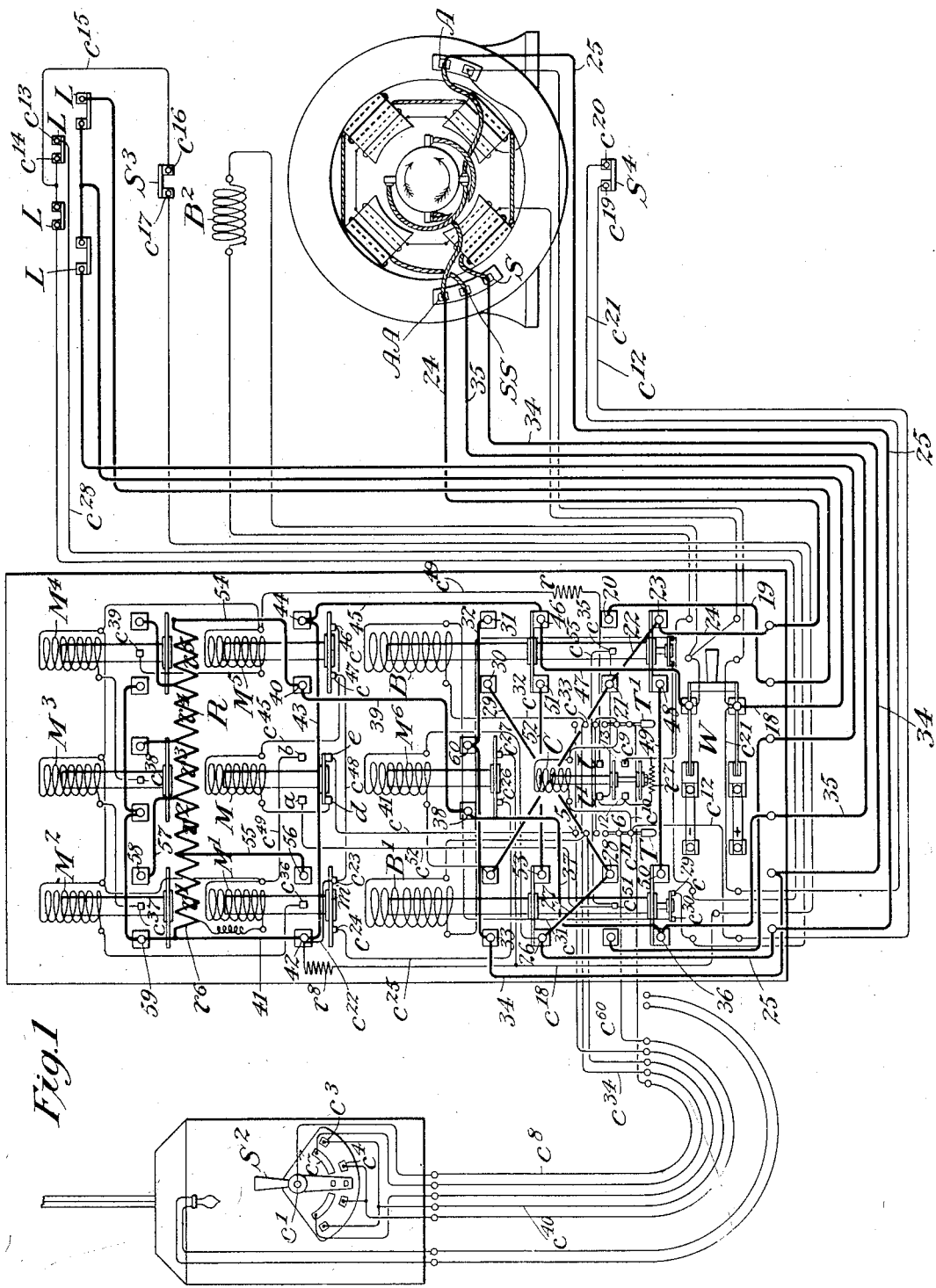

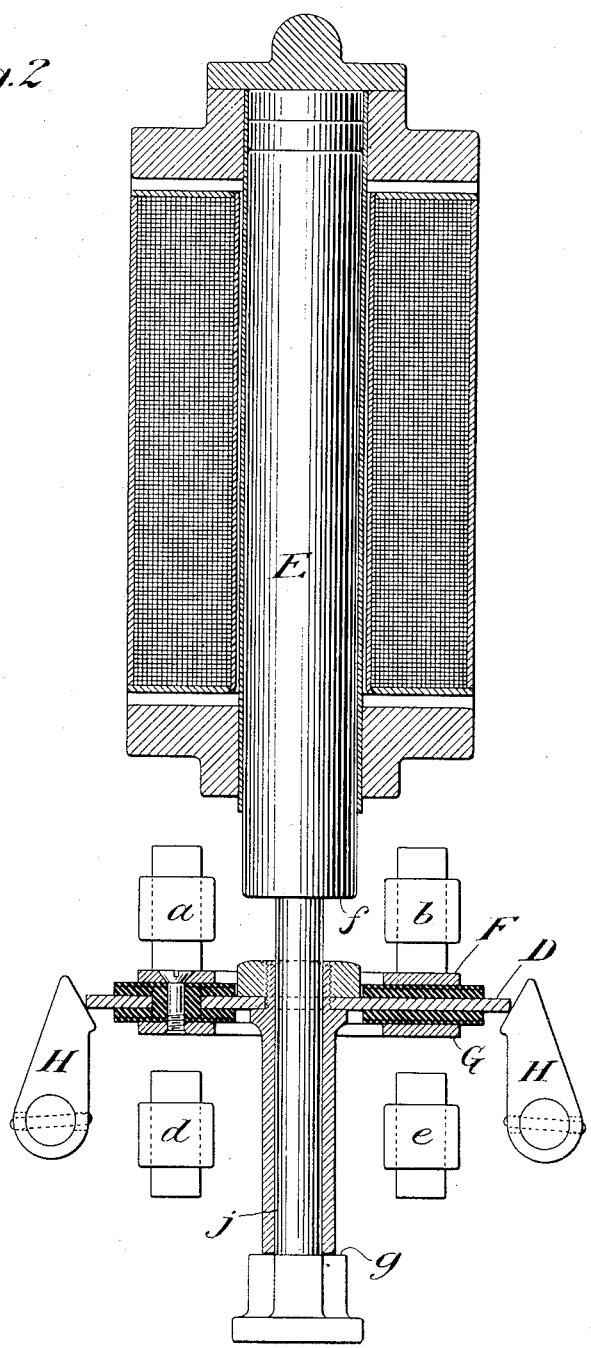

BENJAMIN N. JONES, OF EAST ORANGE, NEW JERSEY, ASSIGNOR TO MARINE ENGINE & MACHINE COMPANY, OF HARRISON, NEW JERSEY, A CORPORATION OF NEW JERSEY.

AUTOMATIC CONTROL SYSTEM FOR ELEVATORS, &c.

No. 850,937.      Specification of Letters Patent.      Patented April 23, 1907.

Application filed April 29, 1903. Serial No. 154,747.

*To all whom it may concern:*

Be it known that I, BENJAMIN N. JONES, a citizen of the United States, residing in East Orange, county of Essex, State of New Jersey, have invented certain new and useful Improvements in Automatic Control Systems for Elevators, &c., of which the following is a specification, reference being had to the accompanying drawings, forming a part hereof.

This invention relates to systems of electric control, with particular reference to such systems as applied in the operation of elevators and other devices which are operated in the same general way. A system of electric control such as is referred to comprises in its simplest form a motor-circuit by which power is delivered to a motor or power-operated device, a circuit through which the delivery of the power to the motor or other power-operated device is controlled, and some form of electrical resistance included in the motor-circuit whereby the power furnished to the motor may be cut down from the maximum power available, there being also provided as a general rule, means under the control of the operator for cutting out portions of this resistance to vary within certain limits the quantity of power furnished to the motor.

In the present system of electric control, which for the purposes of clear exposition will be described and referred to hereinafter as a system of control for elevators, all the resistance of the motor-circuit when the elevator or car is set in motion is to be traversed by the current in the motor-circuit; and one object of this invenion is to provide an improved resistance-regulating means whereby predetermined portions of this resistance may be cut out successively from the motor-circuit until only the desired amount of resistance remains in or until all of the resistance is cut out from said circuit.

Another object of the invention is to provide a "time-interval magnet," so called, which shall be connected in such a way with the resistance-regulating means that it shall operate to determine the rate at which the resistance regulating means shall operate to cut out all or a portion of the resistance, said magnet to be also capable of being adjusted to work rapidly or slowly.

Still another object of the invention is the provision of means to prevent the closing of the motor-circuit unless the entire resistance is in the motor-circuit, and also to prevent the closing of said circuit unless the series field-coil of the motor, where a compound motor is used, is in the motor-circuit.

In the accompanying drawings, Figure 1 is a diagrammatic representation of the circuits and other parts of the system embodying the invention, the main or motor-circuit being shown in relatively heavy lines, while the other circuits are shown in relatively light lines. Fig. 2 is a view, partly in central longitudinal section and partly in elevation, of a magnet or relay, which is referred to herein as the "time-interval" magnet.

The operation of the elevator or car from the controller-handle of switch $S^2$, which is installed in the car, will be briefly referred to at the outset in order that the function of the several circuits and of the other parts of the system presently to be described may be the more readily understood. In starting the car the controller-handle is turned from its central position to one side or the other, the particular side toward which it is moved determining the direction of the car, as usual. It will be assumed for the purposes of this description that the controller is moved toward the left in the diagram, thus moving the switch-blade to the right, which will bring about the closing of the proper circuits to cause the car to move up. When the blade of the switch is in contact with the terminal $c^2$, the control-circuit is closed through the contacts or terminals $c'$ and $c^2$ and under normal conditions will cause the up reversing-switch B to operate and close the motor-circuit at the terminals or contacts 20 and 21, also 30 and 31. Current now being supplied to the motor, the car commences to rise and continues up the shaft slowly so long as the control-circuit is closed at the contact $c'$ and $c^2$. If now it is desired to accelerate the car, the blade of switch $S^2$ is brought in contact with the terminal $c^3$, thus establishing what will be referred to as the "resistance-regulating" circuit, which is established through contact $c'$ and $c^3$ upon switch $S^2$. This circuit operates the time-interval magnet M, which in turn closes the circuit through the resistance-regulating devices, the latter serving to cut out the resistance from the motor-circuit in the manner to be particularly described hereinafter. The amount of resistance cut out of the motor-circuit and the degree of acceleration of the car will depend upon the length of time the blade remains across the terminals $c'$ and $c^3$ and upon the particular adjustment of the time-interval magnet. When the car is to be slowed down, the resistance is thrown back into the motor-circuit by moving the blade of the switch $S^2$ upon contact $c^4$, which serves to open a retaining-circuit through the resistance-regulating device, (which circuit had previously been closed by magnet C in the control-circuit,) thus restoring the resistance-regulating device to its original condition and also causing a slight application of an electromechanical brake. (Shown diagrammatically at $B^2$.) When the car is to be stopped, the controller is returned to its middle position, thus opening the control-circuit, which in turn allows the armature of reversing-switch B to fall, thereby opening the motor-circuit.

The operation of the system will now be explained in detail, and for this purpose the several circuits in the system will be traced and the operation of the several parts of the system will be described, and so far as it is consistent with clearness the description will proceed in the order or sequence with which the several parts of the system operate. The controller-handle being turned to the left in the diagram, as was assumed above, the control-circuit is closed at the contacts $c'$ and $c^2$, and said circuit may be traced as follows: Starting from the contact or terminal $c'$, the current proceeds by wire $c^8$ to and through a controlling-switch $T'$ on the switchboard, by wire $c^9$ to and through the coil of magnet C, by wire $c^{10}$ to contact $c^{11}$ on another switch T on the switchboard, by wire $c^{12}$ to contact $c^{19}$ on a slack-cable switch $S^4$, from contact $c^{20}$ on said switch by wire $c^{21}$ to the positive side of the main switch W upon the switchboard, to and through the source of supply to the negative side of the main switch, by wires 47, 45, and 43 to contact 42 on magnet $M'$, by wire $c^{22}$ to contact $c^{23}$, from contact $c^{24}$ by wire $c^{25}$ to contact $c^{26}$, from contact $c^{27}$ by wire $c^{18}$ to contact $c^{17}$ on a switch $S^3$, which connects the terminals of a speed-governor, from contact $c^{16}$ on the same switch by wire $c^{15}$ to contact $c^{14}$ on the upper limit-switch, from contact $c^{13}$ on said switch by wire $c^{28}$ to contact $c^{29}$ on the down reversing-switch $B'$, from contact $c^{30}$ on the same switch by wire $c^{31}$ to and through the coil of the up reversing-switch B, by wire $c^{32}$ to contact $c^{33}$ of switch $T'$ by wire $c^{34}$ to contact $c^2$ of switch $S^2$, and through the blade of said switch to contact $c^2$, thereby completing the circuit.

In the diagram of Fig. 1 all the parts are indicated in the positions which they assume when the elevator is not in motion, and this condition of the system may be referred to as the "normal" or "stop" position. As soon as the coil of either of the reversing-switches B and $B'$ is energized by the control-circuit, which, as has just been seen, will energize one or the other of these coils, the corresponding core will be raised—in the present instance the core of switch B—and the motor-circuit will be closed. The motor-circuit in the present case is closed at the terminals 20 and 21, and when the car starts said circuit is as follows: from contact 20 to contact 21, (it being understood that the core of magnet B is raised and that these contacts are connected,) by wire 22 to contact 23, by wire 24 to armature-terminal AA of the motor, from armature-terminal A by wire 25 to contact 26, by wire 27 to contact 28, by wire 29 to contact 30, to contact 31, (the core of magnet B being raised,) by wire 32 to contact 33, by wire 34 to terminal S of the series field-coil of the motor, from terminal SS by wire 35 to contact 36, by wire 37 to contact 38, by wire 39 to contact 40, by wire 54 to resistance R, by wire 41 to contact 42, by wire 43 to contact 44, by wire 45 to contact 46, by wire 47 to the negative side of the main switch W to and through the source of supply, by wire 18 to an upper limit-switch, by wire 19 to contact 20, thus completing the circuit. The speed of the car will obviously depend upon the strength of the current in the motor-circuit, which, as was before explained, can be varied between certain limits by changing the amount of resistance in the motor-circuit.

When the car starts, as has just been seen, the entire amount of resistance R is included in the motor-circuit. When it is desired to accelerate the elevator, the circuit through the resistance-regulating device is closed; but before tracing the circuit through said device the device itself will be described. Said device consists of a plurality of magnets (here five, $M'$, $M^2$, $M^3$, $M^4$, and $M^5$) arranged seriatim—that is, to be operated one after another—the coils of the magnet being arranged in parallel with respect to each other upon the circuit through the device, as will be seen presently. One terminal of the coil of each magnet, except the first, is connected with a contact arranged near the armature on the core of the magnet next preceding, whereby upon the operation of any magnet except the last its armature will come in contact with the adjacent terminal of the coil of the magnet next in succession and will close the circuit through the coil of this magnet. For example, the coil $M^2$ has its terminal $c^{36}$ adjacent to the armature $m'$ of magnet $M'$, said armature being adapted, as will be obvious, to contact with terminal $c^{36}$ when magnet $M'$ is operated. The operating-circuit through any of the magnets is as follows: starting with the common wire $c^{40}$, to and through the coils of any of the five magnets to the terminals or contacts (except in the case of M') $c^{36}$, $c^{37}$, $c^{38}$, or $c^{39}$, as the case may be, by wire 41 to contact 42, by wire 43 to contact 44, by wire 45 to contact 46 to the negative side of the main switch W, to and through the source of supply, from the positive side of the main switch to and through one of the limit-switches, to contact 20, to contact $c^{35}$, by wire $c^{55}$ to contact $c^{51}$, by wire $c^{52}$ to contact $a$ on the time-interval magnet M, to contact $b$ on said magnet, to wire $c^{49}$, thus completing the circuit.

Any suitable means under the control of the operator in the car may be employed to effect the opening and closing of this latter circuit, whereby the operator shall at all times have the magnets of the resistance-regulating device under complete control. In the present instance, as shown in the diagram, such means include a device for controlling the time interval between the successive operations of the resistance-regulating magnets. Such device may comprise a magnet M, adapted to close the operating-circuit through the resistance-regulating magnets at the terminals $a$ and $b$, and the circuit through this time-interval magnet M may be closed and opened at the will of the operator at contacts $c'$ and $c^3$. This latter circuit may be traced as follows: starting with contact $c^3$, by wire $c^{40}$ to contact 5 on switch T, by wire $c^{41}$ to contacts $e$ and $d$ to and through the coil of time-interval magnet M, by wire $c^{45}$ to contacts $c^{46}$ and $c^{47}$, by wire $c^{48}$ to contact $c^{23}$, by wire $c^{22}$ to contact $c^{42}$, by wire 43 to contact 44, by wire 45 to contact 46, by wire 47 to the negative side of the main switch W to and through the source of supply, by wire $c^{21}$ through the slack-cable switch $S^4$, by wire $c^{12}$ to contact $c^{11}$ on switch T, by wire $c^{10}$ to and through magnet C, by wire $c^9$ to switch T', by wire $c^8$ to contact $c'$ to contact $c^3$, thus completing the circuit.

The time-interval magnet, Fig. 2, comprises a coil of ordinary form having a central core E, upon which is a loosely-fitting armature collar or disk D, provided with upper and lower contact-plates F and G, respectively. The contact-plates are adapted to connect terminals $a$ and $b$ and $d$ and $e$, respectively, the former pair of terminals, as has already been stated, being in the operating-circuit through the resistance-regulating device and the latter pair of terminals in the circuit through the time-interval magnet. The core E is provided with a reduced portion $j$, upon which the collar G fits as a sleeve, and at one end of the reduced portion $j$ is a shoulder $f$, while at the other end is a head or shoulder $g$. As the core of this time-interval magnet reciprocates up and down the shoulders $f$ and $g$ upon said core will cause the collar D to be brought first against one pair of terminals and then against the other pair of terminals, spring friction-catches H being provided to hold the collar in position against either pair of terminals until one of the shoulders of the armature is brought against said collar upon the next stroke of the core.

It will be seen that upon each upward stroke of the core E the plate $f$ will establish contact between the terminals $a$ and $b$ and complete the circuit through the resistance-regulating device, while at the same time the circuit through the time-interval magnet will be broken on account of the opening of said circuit at the terminals $d$ and $e$. Upon the downward stroke of the core E the circuit through the resistance-regulating device will be opened and the circuit through the time-interval magnet will be closed. Current will be applied to the time-interval magnet as long as the blade of switch $S^2$ connects the terminals $c'$ and $c^3$ and until the magnet $M^5$ operates, for when the magnet $M^5$ operates the circuit through the time-interval magnet will be broken at $c^{46}$ and $c^{47}$. So long as the time-interval magnet operates the core will reciprocate up and down, carrying the armature-collar D with it, and thereby alternately opening and closing the circuit through the resistance-regulating device.

It will be obvious that the interval between the successive opening and closing of this circuit will be equivalent to the length of time for the core E to make one complete stroke up and down. This interval may be varied by providing suitable cushioning devices for the core, so that the proper interval for operating the magnets in the resistance-regulating device successively one at a time—that is, one with each complete stroke of the armature D—may be obtained. For this purpose the core E is regulated or adjusted so that the circuit through the resistance-regulating device may be broken just before or at approximately the same instant that the circuit is completed through the coil of that magnet of the resistance-regulating device which is to be operated upon the next stroke of the core. For illustration, when magnet M operates to close the resistance-regulating circuit at the terminals $a$ and $b$ current will flow first through the coil of magnet M' alone of all the resistance-regulating magnets, and as soon as the armature of magnet M' operates it will close the circuit through magnet $M^2$; but at the instant or just before the instant that the armature of magnet M' comes in contact with terminal $c^{36}$ to close the circuit through magnet $M^2$ the circuit through magnet $M^2$ is broken at the terminals $a$ and $b$ by the time-interval magnet M, the adjustment of which, above referred to, causes its armature to be removed away from said terminals at the instant referred to, whereby the operating-current to magnet $M^2$ will be opened, and said magnet will not be operated until the armature of magnet M is again brought in contact with the terminals $a$ and $b$. This will occur, as will be obvious, upon the next upward stroke of the core of the time-interval magnet.

It will be understood that instead of a time-interval magnet, as M, for regulating the interval between the successive operations of the magnets of the resistance-regulating device other means might be employed for this purpose. For example, the cores of each of the magnets themselves might be provided with a dash-pot or similar resisting device to time the respective operations of these magnets. It will also be understood that such means might be dispensed with altogether and the resistance-regulating circuit closed directly by the operator in the car—that is, without the interposition of any time-interval magnet or similar device.

In order to retain the cores of these magnets of the resistance-regulating device which have been operated in the manner just described, an auxiliary circuit is provided which is closed at the terminals $l$ and $l'$ by the magnet C in the control-circuit, so that when the current through the resistance-regulating circuit is broken by the time-interval magnet the current in the auxiliary circuit, which flows constantly as long as the control-circuit remains closed, will furnish sufficient energy to the resistance-regulating magnets to cause their cores to be retained. This auxiliary circuit may be traced as follows: from contact $l$ through the resistance $r$ and wire $c^{49}$ to the coils of any of the magnets, to and through these coils to the terminals $c^{36}$, $c^{37}$, $c^{38}$, and $c^{39}$, as the case may be, to conductor 41, to contact 42, by wire 43 to contact 44, by wire 45 to contact 46, by wire 47 to negative side of the main switch W, to and through said switch to wire 18 to and through one of the limit-switches, to contact 20, to contact $c^{35}$, to contact $l'$, to contact $l$, thus completing said circuit. The strength of said circuit is just sufficient to retain the cores of the magnets which have been operated, but it is not sufficient to operate the magnets. The resistance $r$ is inserted in this circuit in order to reduce the current to the proper strength.

It will be easily seen from the diagram that by the operation of the several magnets of the resistance-regulating device certain portions of the resistance R which are severally controlled by these respective magnets will be cut out successively from the motor-circuit as the magnets are operated, for when magnet M' is operated current in the motor-circuit will flow by wire 55 to contact 56, to contact 42 instead of through the portion $r'$ of resistance R and the wire 41, and when magnet $M^2$ operates current in the motor-circuit will flow through wire 57 to contact 58, to contact 59, to wire 41, to contact 42 instead of through the portion $r^2$ of resistance R to wire 55, to contact 56, to contact 42. It will thus be seen that magnets M' and $M^2$ will operate to cut out, respectively, the portions $r'$ and $r^2$ of the resistance R which they respectively control, and it will be obvious upon reference to the diagram of Fig. 1, that magnets $M^3$, $M^4$, and $M^5$ will operate to cut out the portions $r^3$, $r^4$, and $r^5$ of the resistance R, respectively, in the same manner.

In order to still further increase the speed of the car, the series field coils of the motor, a compound motor being used, may be short-circuited, and for this purpose a magnet $M^6$ is provided and may be operated in the same manner as the starting-magnets, or, as shown in the drawings, by connecting it up across the armature-terminals of the motor. It will be obvious from the diagram that the operation of said magnet will connect contact 38 with contact 60, thus establishing the following line across the series field-coils of the motor: terminal S of the series field-coil, wire 34, terminal 33, terminal 60, contact 38, wire 37, contact 36, terminal SS of the series field-coils of the motor. The coil of the magnet $M^6$ may be and preferably is adjusted to operate at a predetermined potential of the armature-terminals.

The slowing up of the car, which, as hereinbefore referred to, is effected by bringing the blade of the switch $S^2$ in contact with the terminal $c^4$, is due to the returning of the resistance-regulating device to its original or normal condition. By bringing the blade of the switch $S^2$ into the position just referred to in order to connect the terminals $c'$ and $c^4$ a path around the magnet C is offered by the following line: terminal $c^4$, wire $c^{60}$, terminal 6, switch T, terminal $c^{11}$, wire $c^{12}$ $c^{19}$ $c^{20}$, wire $c^{21}$ to positive side of the main switch W. The core of said magnet is thus caused to drop and the current through the auxiliary circuit for retaining the resistance-regulating magnets to be broken at the terminals $l$ and $l'$. Furthermore, the moving of the switch-blade causes the current-supply to be cut off from the time-interval magnet. Accordingly it will be clearly seen that the resistance-regulating device is brought to its first position. The dropping of the core of magnet C also effects the application of an electromechanical brake $B^2$ by causing the resistance $r^7$ to be inserted in the brake-circuit, which is broken by the dropping of said core at the terminals 12 and 13. In this way the car, although descending with a heavy load, may be slowed up quickly and without any shock to the hoisting apparatus.

When the elevator is brought to a full stop by returning the controller $S^2$ to its central position, the control-circuit is opened, and consequently the core of reversing-magnet B drops, thereby opening the motor-circuit and cutting off the supply of current to the motor. The entire system is thus brought back to normal or stop position. In this position a circuit is established around the armature-terminals and through a fixed portion of the resistance R, which may be traced as follows: commencing at the armature-terminal AA by wire 24 to contact 23, to contact 48, by wire 49 to contact 50, to contact 36, by wire 37 to contact 38, by wire 39 to contact 40, by wire 54 to resistance R, by wire 41 to contact 42, by wire 43 to contact 44, by wire 45 to contact 46, to contact 51, by wire 52 to contact 53, to contact 26, by wire 25 to the terminal A of the armature. The object of establishing this circuit around the armature is to retard the motor by taking advantage of the dynamic braking effect by allowing the armature of the motor, which is rotated by the inertia of the system after the current has been turned off, to generate current through a suitable resistance.

It will be noted that in the control-circuit the terminals $c^{23}$ and $c^{24}$ are connected by the armature $m'$ of the first of the resistance-regulating magnets M' and that when this magnet operates to cut out the portion $r'$ of the resistance R the connection between $c^{23}$ and $c^{24}$ will be broken, and the control-circuit would be opened were it not for the provision of a retaining-line around the terminals $c^{23}$ and $c^{24}$, containing the resistance $r^8$ and connecting terminal 42 with wire $c^{18}$. When the control-current is compelled to flow through the line just referred to, which contains resistance $r^8$, it will be so reduced in potential on account of said resistance as to be unable to operate either of the reversing-switches B or B', although it will be of sufficient strength to retain the armatures of these switches in case they have already been operated. Hence it will be seen that in case the resistance-regulating device should fail to return to the normal or stop position when the switch $S^2$ is returned to its central position to stop the car, the control-circuit being open at the terminals $c^{23}$ and $c^{24}$, the current in said circuit will be compelled to flow through the resistance $r^8$ and will be insufficient to operate either of the reversing-switches to close the motor-circuit and start the car. In this way, therefore, the car is prevented from starting except when all the resistance R is included in the motor-circuit. In the same manner a second pair of terminals $c^{26}$ and $c^{27}$ is provided in the control-circuit, which terminals are normally connected by the armature of the magnet $M^6$, the function of which magnet, as has already been explained, is to operate to cut out the series field-coil of the motor from the motor-circuit While the series field-coil is thus short-circuited, the contacts $c^{26}$ and $c^{27}$ have no electrical connection, and hence the control-circuit is compelled to flow through resistance $r^8$, whereby it is insufficient to operate the reversing-switches to start the car.

I claim as my invention—

1. In a system of electric control, the combination of a motor-circuit, a resistance in the motor-circuit, a plurality of magnets controlling separate portions of the resistance in the motor-circuit and arranged *seriatim*, the coil of each magnet except the first having a terminal at one end with which a conducting-plate carried by the armature of the magnet next preceding is adapted to contact to complete the circuit through said coil, a circuit through said magnets, a time-interval magnet, the core of said time-interval magnet being adapted to open the circuit through its own coil and to close the circuit through the first-named magnets at one end of its stroke and at the other end of its stroke to open the last-named circuit and close the circuit through its own coil.

2. In a system of electric control, the combination of a motor-circuit, a resistance in the motor-circuit, a plurality of magnets controlling separate portions of the resistance in the motor-circuit and arranged *seriatim*, the coil of each magnet except the first having a terminal at one end with which a conducting-plate carried by the armature of the magnet next preceding is adapted to contact to complete the circuit through said coil, a circuit through said magnets, a time-interval magnet, the core of said time-interval being adapted to open the circuit through its own coil and to close the circuit through the first-named magnets at one end of its stroke and at the other end of its stroke to open the last-named circuit and close the circuit through its own coil, and means to maintain in a state of energization those of the first-named magnets which have been operated.

3. In a system of electric control, the combination of a motor-circuit, a resistance of the motor-circuit, a plurality of magnets controlling separate portions of the resistance in the motor-circuit and arranged *seriatim*, the coil of each magnet except the first having a terminal at one end with which a conducting-plate carried by the armature of the magnet next preceding is adapted to contact to complete the circuit through said coil, a circuit through said magnets, a time-interval magnet, the core of said time-interval magnet being adapted to open the circuit through its own coil and to close the circuit through the first-named magnets at one end of its stroke and at the other end of its stroke to open the last-named circuit and close the circuit through its own coil and an auxiliary circuit to maintain in a state of energization those of the first-named magnets which have been operated.

4. In a system of electric control, the combination of a motor-circuit, a resistance in the motor-circuit, a plurality of magnets controlling separate portions of the resistance in the motor-circuit and arranged *seriatim*, the coil of each magnet except the first having a terminal at one end with which a conducting-plate carried by the armature of the magnet next preceding is adapted to contact to complete the circuit through said coil, a circuit through said magnets, a pair of terminals in said circuit, a time-interval magnet, a circuit through said magnet, a pair of terminals in said circuit, said time-interval magnet having a core adapted to move forward when the magnet loses its energy, a conducting-plate loose upon said core, means to hold the plate against either pair of contacts, and a shoulder upon said core to move the plate from one pair of contacts to the other.

5. In a system of electric control, the combination with a motor-circuit and means for varying the resistance in the motor-circuit, of a time-interval magnet comprising a coil, a core, a conducting-plate loose upon said core, a pair of terminals or contacts in the circuit through said coil, a second pair of terminals or contacts, connected with said means, said plate being adapted to be moved from one pair of terminals to the other pair of terminals.

6. In a system of electric control, the combination with a motor-circuit and means for varying the resistance in the motor-circuit, of a time-interval magnet comprising a coil, a core, a conducting-plate loose upon said core, a pair of terminals or contacts in the circuit through said coil, a second pair of terminals or contacts connected with said means, said plate being adapted to be moved from one pair of terminals to the other pair of terminals, and means to hold said plate against either pair of terminals.

7. In a system of electric control, the combination with a motor-circuit and means for varying the resistance in the motor-circuit, of a time-interval magnet comprising a coil, a core, a conducting-plate loose upon said core, shoulders upon said core, a pair of terminals or contacts in the circuit through said coil, a second pair of terminals or contacts connected with said means, said shoulders moving the plate from one pair of terminals to the other as the core is reciprocated into and out of the magnet, and means to hold said plate against either pair of terminals.

8. In a system of electric control, a motor-circuit, a control-circuit, a magnet in the control-circuit and adapted to close the motor-circuit, a resistance-regulating device, terminals in the control-circuit controlled by the resistance-regulating device, a retaining-line in the control-circuit around said terminals, and a resistance in the retaining-line to cut down the potential of the control-current therein to prevent the operation of the magnet in the control-circuit for the purpose specified.

9. In a system of electric control, the combination of a motor having a series field-coil, a motor-circuit normally including said coil, a resistance in the motor-circuit, a control-circuit in operative relation with the motor-circuit, a magnet bridged across the armature-terminals of the motor and arranged to short-circuit the series field-coil of the motor, and terminals in the control-circuit controlled by said magnet.

10. In a system of electric control, the combination of a motor having a series field-coil, a motor-circuit normally including said coil, a resistance in the motor-circuit, a control-circuit in operative relation with the motor-circuit, a magnet bridged across the armature-terminals of the motor, contacts connected with the terminals of the series field-coil and adapted to be connected by the contact device carried by the armature of the magnet to short-circuit the series field-coil, and terminals in the control-circuit controlled by said magnet.

This specification signed and witnessed this 21st day of April, A. D. 1903.

BENJAMIN N. JONES.

In presence of—
ANTHONY N. JESBERA,
LUCIUS VARNEY.